United States Patent
Winberg

[15] 3,645,591
[45] Feb. 29, 1972

[54] FIXED SHAFT ROTARY SEAL ASSEMBLY

[72] Inventor: Douglas F. Winberg, Bellevue, Wash.
[73] Assignee: Subterranean Tools, Inc.
[22] Filed: May 8, 1969
[21] Appl. No.: 822,920

[52] U.S. Cl. ..................................................308/187.1
[51] Int. Cl. ..............................................F16c 33/76
[58] Field of Search.....................................308/187, 187.1

[56] References Cited

UNITED STATES PATENTS

| | | | |
|---|---|---|---|
| 2,311,287 | 2/1943 | Boden | 308/187.1 |
| 2,077,881 | 4/1937 | Gits | 308/187.1 |
| 2,911,241 | 11/1959 | Horvath et al. | 308/187.1 |
| 3,216,513 | 11/1965 | Robbins et al. | 308/187 |
| 3,469,851 | 9/1969 | Enemark | 308/187 |

*Primary Examiner*—Martin P. Schwadron
*Assistant Examiner*—Frank Susko
*Attorney*—Melvin A. Crosby

[57] ABSTRACT

The disclosure herein relates to a rotary seal assembly, wherein a fixed shaft supports a rotary assembly, such as a cutter assembly for tunnel boring and mining, and the rotary assembly is mounted by antifriction bearings. In order to maintain lubricant in the bearing and exclude pieces of material being drilled from the bearings, a seal is provided. This seal is between a metallic ring carried by the rotor, as the outer bearing race of the antifriction bearing, and a graphite ring carried by the stator. The seal is between two relatively slidingly engaging, annular faces or annular seals. The graphite seal is urged toward the metallic ring so as to seat the graphite seal and the metallic ring.

22 Claims, 13 Drawing Figures

INVENTOR.
Douglas F. Winberg
BY
T W Secrest

Patented Feb. 29, 1972 3,645,591
3 Sheets-Sheet 2
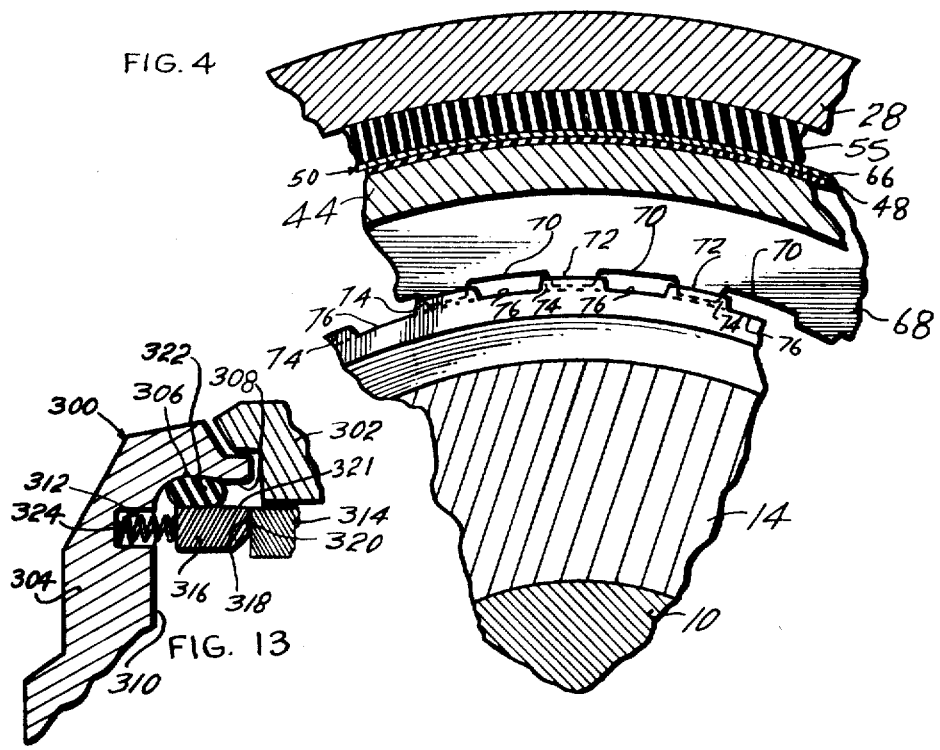
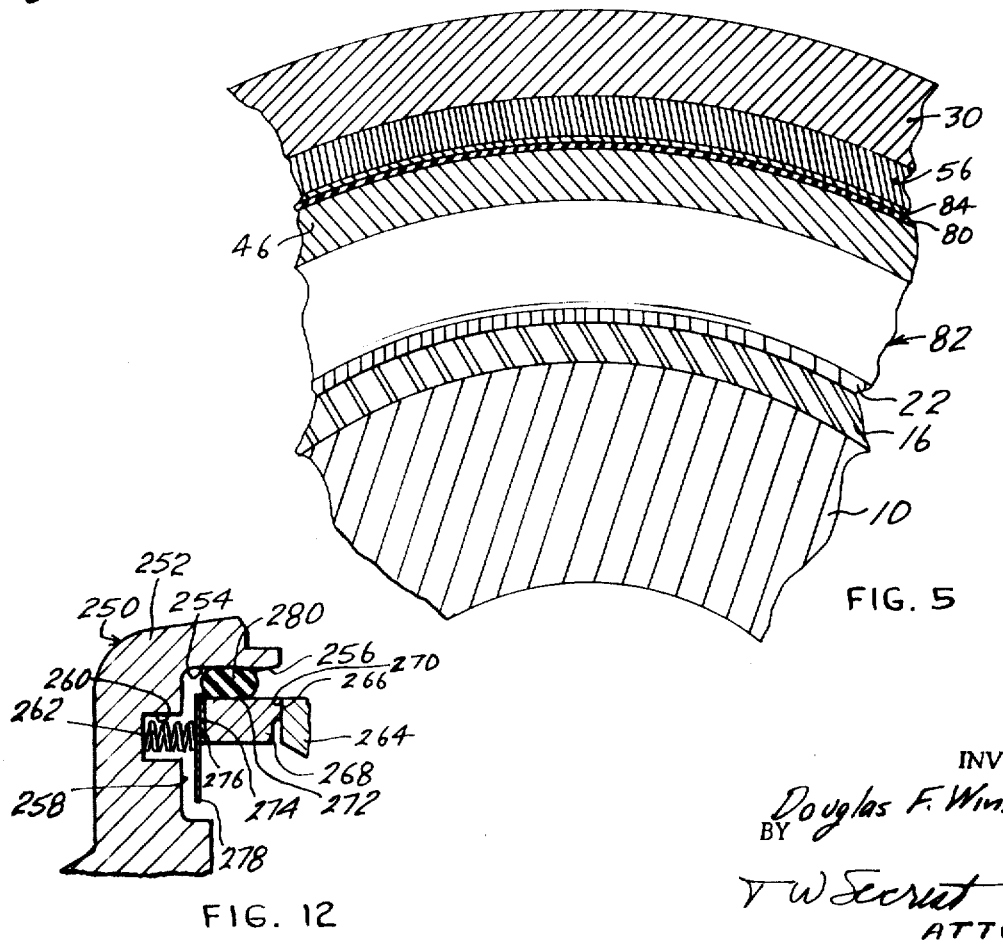
INVENTOR.
Douglas F. Winberg
BY
T W Secrist
ATTORNEY

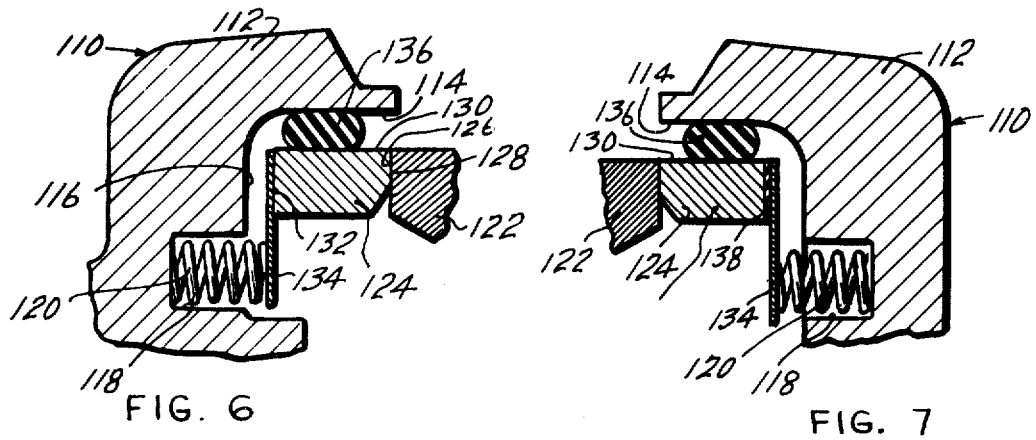
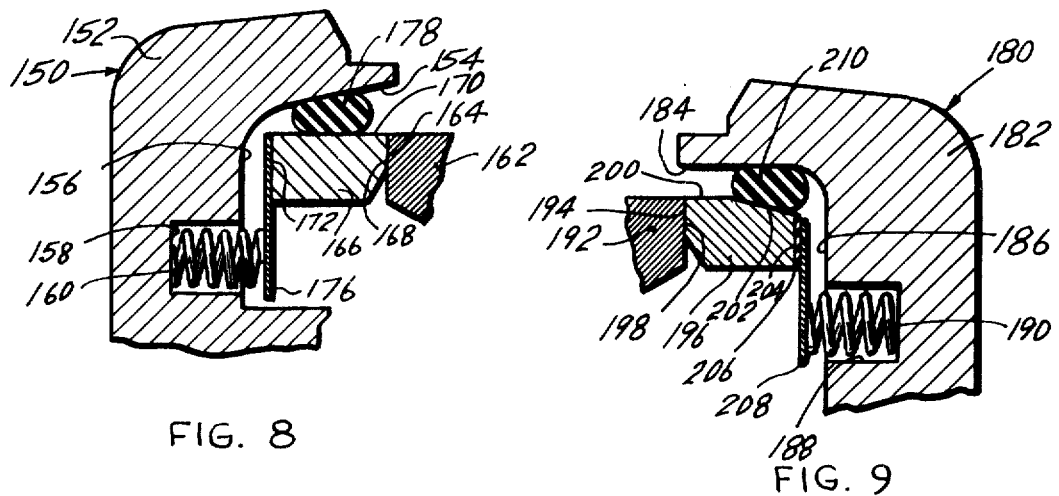
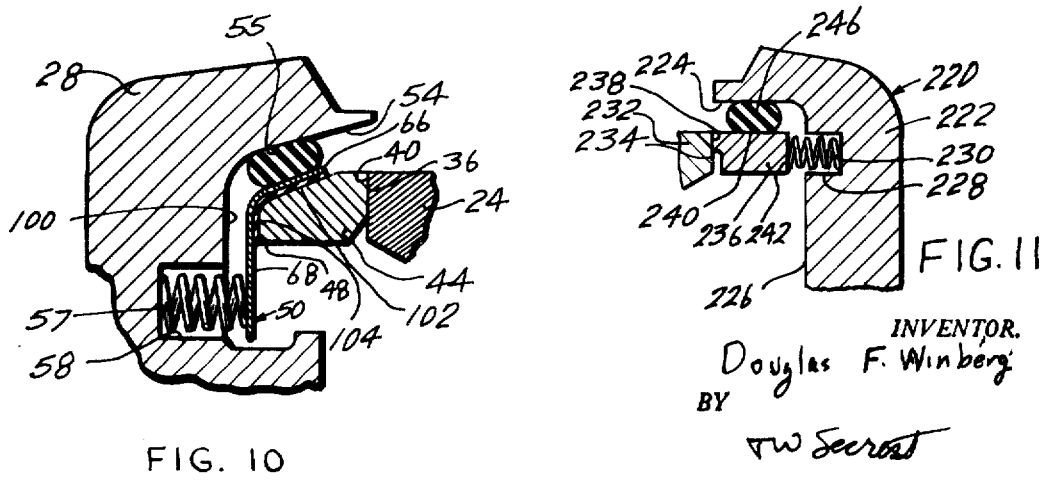

FIXED SHAFT ROTARY SEAL ASSEMBLY

My invention relates to a rotary seal assembly used in combination with a fixed shaft, a rotor, and an antifriction bearing means.

A typical environment in which my invention is used is illustrated and described in U.S. Pat. No. 3,216,513, issued Nov. 9, 1965, and of which I am a coinventor.

Such prior art invention provides a metal-to-metal seal between two rings, one of which rings is carried by the stator and the other carried by the rotor.

It is an object of my invention to improve the prior art metal-to-metal seal and to provide in place thereof a metal-to-carbon-graphite seal and between two rings, one carried by the rotor and the other carried by the stator.

It is a more specific object to provide a metal ring, carried by the rotor, and which is preferably the outer race of an antifriction roller bearing, and a carbon-graphite ring carried by the stator which includes the fixed or nonrotating shaft.

Another more specific object is to provide a protective retainer shell or ring for the graphite seal and to which is adhesively secured one face of a rubber sheet ring, and to the other face of said rubber sheet ring is adhesively secured a carbon-graphite ring.

Another more specific object is to employ in certain species, a compressed rubber O-ring to urge the upper portions of said brackets, and the carbon-graphite rings carried thereby, toward said protective retainer shell or ring and to employ compression springs to move the lower portions of said shell or ring, and the carbon-graphite ring, horizontally toward said metallic ring.

Another more specific object is to employ said shell or ring in a form which is substantially inverted L-shaped in section.

A further object is to provide a flexible O-ring to function as a static seal or packing to retain the lubricant and exclude particles of material resulting from boring A still further object is to provide an O-ring to assist in radially locating and in supporting the graphite seal within the sleeve.

An additional object is to provide an O-ring to provide a reaction means to the turning moment on the graphite seal and which turning moment results from friction at the seal face and rotation of the rotor seal face.

In connection with this invention, one of the two rings used to provide the seal is a carbon-graphite ring. Such rings are readily available on the market and one source thereof is from Pure carbon Company, Inc., of St. Marys, Pennsylvania. The products are sold under the trade name of "PUREBON." While many grades of carbon-graphite are manufactured by said company and many of the same may be satisfactorily used in practicing of my invention, a typical one has the following specification as listed by said company:

GRADE—P—55; Apparent Density (gm./cc.)—2.35; Hardness—Shore Scleroscope—90; Compress. p.s.i.—42,500; Transverse p.s.i.—13,000; Tensile p.s.i.—9,000; Modulus of Elasticity × $10^6$—4.0; Neutral Atmosphere (° F.)—1,500; Oxidizing Atmosphere (° F.)—500; Corrosion Resistance Group—R—10; Coefficient of Thermal Expansion (in./in./° F. × $10^{-6}$)—3.0; Permeability (Darcies $10^{-6}$)10; Porosity (Vol. percent)—5.

Another typical one has the following specification as listed by said company:

GRADE P—658RC; Apparent Density (gm./cc.)—1.80 Hardness—Shore Scleroscope—90; Compress. p.s.i.—37,500; Transverse p.s.i.—11,000; Tensile p.s.i.—8,000; Modulus of Elasticity × $10^6$—3.1 Neutral Atmosphere (° F.)—1,200; Oxidizing Atmosphere (° F.)—500; Corrosion Resistance Group—R—3; Coefficient of Thermal Expansion (in./in./° F. × $10^{-6}$)—2.2; Permeability (Darcies $10^{-6}$)—0.3; Porosity (Vol. percent)—2.

Some of the main advantages in the use of carbon-graphite-to-metal seal are: self-lubrication from the carbon-graphite particles; reasonably high compression strength; resistance to chemical corrosion; resistance to oxidation; low coefficient of friction; and wear resistance.

The above-mentioned objects and advantages of this invention, together with other inherent in the same, will become explicit or implicit as the description of this invention continues in connection with the drawings, throughout which like reference numerals indicates like parts and wherein.

Figure 1:
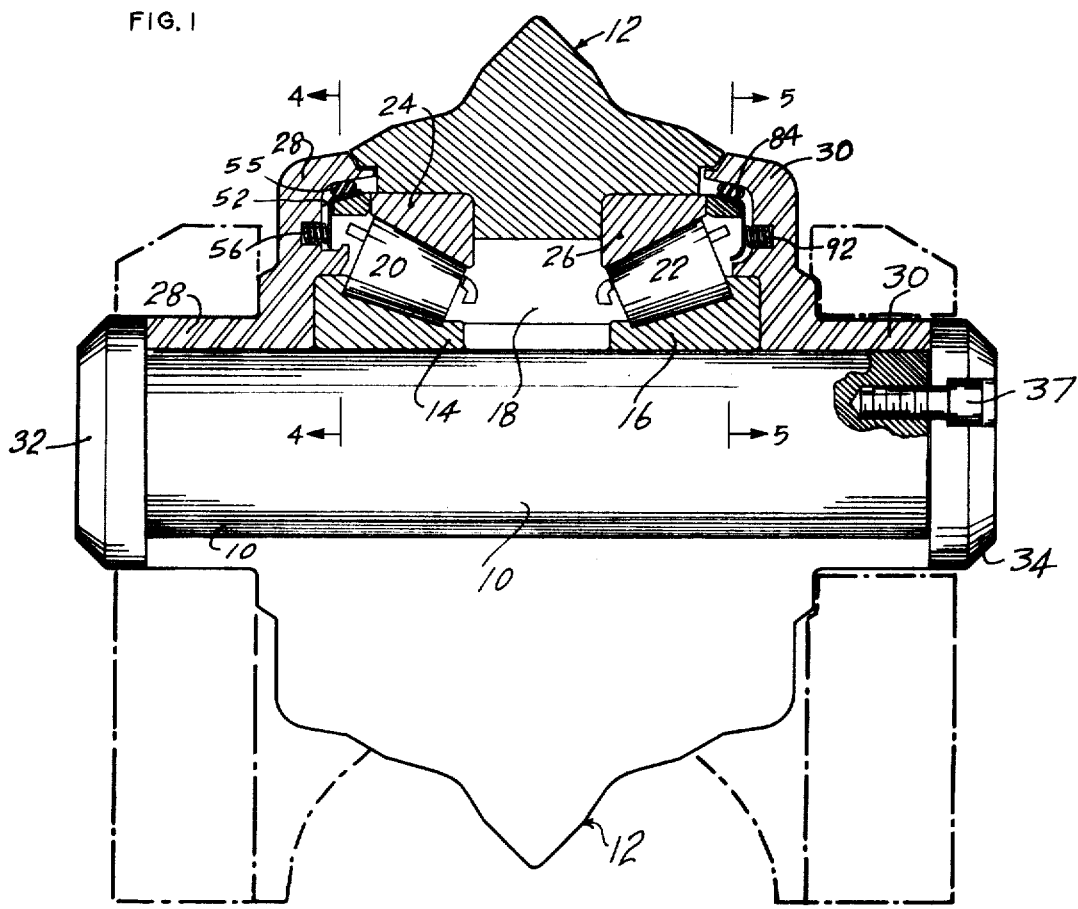
FIG. 1 is a view partly in section and partly in elevation, of a cutterhead incorporating the sealing means of this invention.
Figure 2:
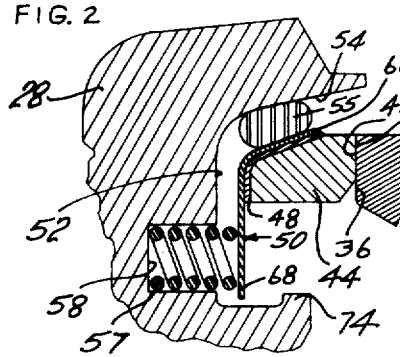
FIGS. 2 and 3 are enlarged fragmentary views of parts shown in FIG. 1 and more particularly the parts providing the seal of this invention.

FIGS. 4 and 5 are enlarged fragmentary sectional views taken respectively, substantially on broken lines 4—4 and 5—5 of FIG. 1;

FIG. 6 is a fragmentary lateral cross-sectional view of another sleeve having an inner cylindrical or an inner radial surface and of a seal having an outer, cylindrical or an outer radial surface with an O-ring between them;

FIG. 7 is a lateral, cross-sectional view of a sleeve having an inner cylindrical or an inner radial surface and a seal having an outer cylindrical or an outer radial surface with an O-ring between them;

FIG. 8 is a fragmentary lateral cross-sectional view of a sleeve having an angular or conical inner surface and a seal having a cylindrical or radial outer surface with an O-ring between them;

FIG. 9 is a fragmentary lateral cross-sectional view illustrating a sleeve having an inner cylindrical or an inner radial surface and a seal having an angular or conical outer surface and an O-ring between them;

FIG. 10 is the same as FIG. 2 and illustrates a sleeve having an angular or conical inner surface and a seal having an angular or conical outer surface and an O-ring between them; and FIG. 11 is a fragmentary lateral cross-sectional view of another sleeve having an inner cylindrical or an inner radial surface and of a seal having an outer cylindrical or an outer radial surface with an O-ring between them and a spring directly urging the seal against the race of a bearing; and, FIG. 12 is a fragmentary lateral cross-sectional view of another sleeve having an outer cylindrical or an inner radial surface and of a seat having an outer cylindrical or an out radial surface with an O-ring between them and a spring bearing against a protective shell for the seal.

The cutter assembly of FIG. 1 is especially adapted for use on the cutterhead of a tunnel boring machine, such as the type described in the applications, wherein I am one of the coinventors, and which applications bear Ser. No. 203,846, filed June 20, 1962, and Ser. No. 335,882, filed Jan. 6, 1964 (now U.S. Pat. No. 3,216,513). For a more extensive and comprehensive discussion and disclosure of a tunnel boring machine, reference is made to such applications. To the extent that it may be necessary or expedient for a clear understanding of the present invention, such applications are hereby expressly incorporated herein by reference.

Referring now to the drawings, a fixed or nonrotating shaft 10 rotatively mounts a cutting wheel 12. In view of the expected wear on the cutting portion of the cutting wheel 12, the same or the cutting portion thereof should be replaceable, all as is taught by said application, now U.S. Pat. No. 3,216,513.

Encircling the shaft 10 and the midlength thereof are two inner bearing races 14 and 16 which are relatively fixed on said shaft 10 during operation. The inner bearing races 14 and 16 are spaced from each other axially on shaft 10, as by cutter 12, and provide a chamber 18. The inner races 14 and 16 mount roller bearings 20 and 22 and in turn the outer races 24 and 26. For points of reference, the terms "inner" and "outer" as used herein define proximity to the longitudinal axis of the shaft 10 while "inside" and "outside" define proximity to a transverse plane passing through the midlength of the shaft 10. The outer races 24 and 26 are carried by and spaced from each other on shaft 10 by the cutting wheel 12.

Sleeves 28 and 30 are spaced apart in a direction axially of shaft 10 and retain inner races 14 and 16 from movement toward the outside. The sleeves 28 and 30 are retained against movement toward the outside by end caps 32 and 34. One of the end caps 32 or 34 may be rigid with the fixed shaft 10 and the other thereof may be screwed thereto as by screw 37.

Figure 3:
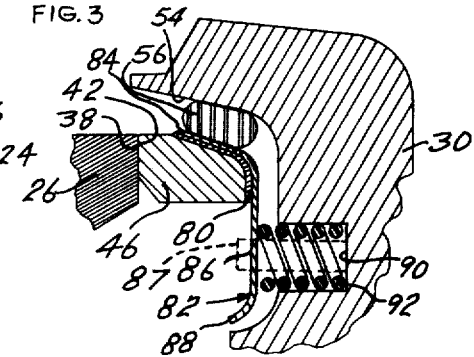

Thus far in connection with the description of the drawings, there has been described substantially the structure of said U.S. Pat. No. 3,216,513 or the equivalent thereof. However, a different seal is provided in this invention to seal in the lubricant for the roller bearings 20 and 22 and to seal out the grit and residue resulting from the grinding and cutting action of the cutting wheel 12. This seal comprises a metallic ring carried by the rotor, comprising the cutting wheel 12, and which ring may be in the form of the outer races 24 and 26. The sealing faces of said rings will be the annular ring faces 36 and 38 (FIGS. 2 and 3). Sealing against said faces 36 and 38 are stationary annular faces 40 and 42 of carbon-graphite rings 44 and 46. Each of said rings 44 and 46 is preferably mounted by adhering the same to an annular ring of a yieldable, flexible material 48, said yieldable, flexible material 48 may be rubber or a plastic such as polyurethane. 48 in turn may be bonded to a hard, protective shell 50 of metal or one of the modern plastics. In addition, the resilient connection between the carbon-graphite rings 44 and 46 through the yieldable, flexible material 48 to the bracket 50 is desirable. Preferably, the inner walls 52 and 54 of each sleeve 28 and 30, adjacent respectively the outside and outer surfaces of the carbon-graphite rings 44 and 46, form substantially a right angle with the surface 54 being angular and thus the angle of said opening is an obtuse angle. The protective shell 50 conforms to the configurations of the juncture of the walls 52 and 54 and is substantially of inverted L-shape and has a portion 66 inclined outwardly to the horizontal and a portion 68 disposed substantially vertically. A flexible yieldable O-ring 55 is disposed between a wall 54 and the adjacent portion 66 of a bracket 50. When in use said O-ring 55 is compressed, as shown, and thus provides a force diagonally directed against a carbon-graphite ring 44 inwardly and to the inside and toward the metal ring provided by an outer race 24 of an antifriction bearing. A compression spring 57 is mounted within a recess 58 in sleeve 28 and provides a horizontal pressure between a sleeve 28 and a portion 68 of the bracket 50. By so urging bracket portions 68 a horizontal pressure is exerted urging the carbon-graphite ring 44 to the inside.

The free inner edge of 68 is serrated to have recesses 70 and tongues 72 (FIG. 4). The sleeve 28 is provided with a plurality of circumferentially spaced tongues 74 and recesses 76. The tongues 72 fit with the recesses 76 and the tongues 74 fit with the recesses 70 to permit relative axial movement of the sleeve 28 and the protective shell 50. Likewise these tongues and recesses can function to restrict relative axial movement of the sleeve and shell.

The graphite ring 46 has adhered to its outside surface and edge a yieldable, flexible material 80. The yieldable, flexible material 80 may be rubber or a plastic such as polyurethane or other suitable material. There is adhered to the outside of 80 a protective shell 82 and which shell 82 may be generally of a ringlike configuration. The protective shell 82 on its outer part has a sloping surface 84 which covers the outer sloping surface of the graphite ring 46. Then, the sloping region 84 is directed inwardly into an annular region 86. The outer part of the annular region 86 covers the inner part of the yieldable, flexible ring 80. Then, the innermost part of 82 bends inwardly at 88 to form a stiffener for 82. Numeral 88 makes a more stiff protective shell 82. In the sleeve 30 there are a number of recesses 90. In the recesses 90 there are a number of spring 92 or yieldable members 92. The springs 92 press against the sleeve 30 and also against the annular region 86 of the protective shell 82.

An O-ring 56 is positioned between the surface 54 of the sleeve 30 and between the surface 84 or the region 84 of the protective shell 82. The O-ring 56 urges the graphite seal 46 toward the surface 38 of the race 26. Further, the spring 92 urges the graphite seal 46 toward the surface 38 of the race 26.

The O-rings 55 and 56 are of a yieldable, flexible material and sufficiently resilient to urge the graphite seals toward the face of the race. Suitable materials of construction for the O-rings 55 and 56 are rubber and plastic such as polyurethane and other plastics.

In FIG. 3 there is illustrated the use of a pin 87. The pin 87 projects through the shell 86 and into the recess 90. The pin 87 restricts the rotation of the hard protective shell 82 and the graphite seal 46. By this restriction of rotation there is less stress and strain on the O-ring 56 and, therefore, the O-ring 56 has a longer life.

The use of a graphite-to-metal seal is of value in regard to the restricted space application in certain instances. In certain cutters and other mechanical devices, there is a limited space to provide a seal. Instead of two metal-to-metal seals or instead of two graphite-to-graphite seals there may be used a single graphite seal in conjunction with the member of either a stationary or metal surface or a rotating metal surface. Further, the rotor 12, of this invention, is not resiliently mounted and therefore the use of the rubber O-ring and the graphite seal assist in decreasing the wear on the sealing surfaces. An advantage of a graphite seal is that for small production runs it is possible to machine the graphite to the desired configuration. This is not economically possible with a metal seal. Further, with a graphite seal against a metal surface, the metal surface need not be finished to such a high degree as a metal-to-metal surface. Graphite is softer than metal and therefore will wear to seat itself with the metal sealing surface. Most of the metal sealing surfaces are a stainless steel or a steel. If there be a metal-to-metal seal, it is necessary to have a fine and accurate finish on each of the metal sealing surfaces. With a graphite-to-metal seal, the surface of the metal need not be machined to such a fine and high quality finish as the graphite will readily wear and seat itself with the metal seal.

In these seals, the O-ring assists in preventing dirt, extraneous material and rock from entering into the bearing area. Further, the O-ring assists in locating the seal assembly and radially provides a concentric mounted seal base with respect to the metal seal. In addition, the O-ring proves a reaction means to the turning moment on the graphite seal and which turning moment results from friction at the seal face and rotation of the seal face of the rotor. Finally, the O-ring provides a resilient mounting for the graphite seal assembly thereby tending to permit the seal assembly to vibrate with a relative frequency of the mating metal seal face on the rotor and without undue wear on the seal face of the graphite. There may be introduced into the interior of the cutter an oil lubricant to assist in lubricating the bearings. However, the lubricant also functions as a heat transfer fluid to conduct heat away from the graphite-to-metal surfaces and into the body of the oil fluid and from there conduct heat to the metal shell or the rotor and the sleeve. This conduction of heat away from the seals lessens the possibility of a high temperature rise in the vicinity of the seals and a high temperature rise in the O-ring. Therefore, there is less possibility of damage to the O-ring. If the temperature becomes too high in the O-ring, there may be a permanent deformation and therefore the O-ring looses its urging force to urge the seal against the metal surface of the bearing. In this regard, the springs 57 and 92 assist in urging the seals 44 and 46 against the sealing face or the metal surface of the bearing. The springs 57 and 92, being of metal, will not readily loose their spring coefficient with a moderate rise in temperature in the vicinity of the seals.

The seal retainer shells 50 and 82 are of value in making it possible to mold a graphite seal in the form of a ring. The molded graphite seal in the form of the ring will not have as fine a tolerant as the machine graphite seal. However, by providing a yieldable, flexible material such as 48 or 80 between the graphite seals and the protective shell, the variation in tolerance can be compensated. Then, with the protective metal it is possible to have a close tolerance with the protective metal shell. In this regard, a lower cost and satisfactory seal can be formed.

From the foregoing it will now be apparent that I provided in combination with a fixed shaft, as shaft 10, a rotor typified by a cutting wheel 12 and antifriction bearing means, as roller bearings 20 or 22, and a rotary seal assembly. This rotary seal assembly comprises a metallic ring carried by the rotor, preferably an outer race 24 or 26 of the roller bearings, and which ring provides a rotating sealing face 36 or 38. In sliding, contacting relation with said sealing face 36 or 38 is a sealing face 40 or 42 of a carbon-graphite ring 44 or 46. The means to move said carbon-graphite face toward and maintain the same in sealing relation with a metallic sealing face 36 or 38 comprises elastic rubber O-rings 55 and compression springs 57. The said O-rings 55 and compressing springs 57 function through brackets 50, which are substantially of inverted L-shape, to provide a diagonally directed pressure and a horizontally directed pressure against carbon-graphite rings 44 and 46. The brackets 50 mount said carbon-graphite rings 44 and 46 through the intermediary of an elastic rubber sheet ring 48 having one face thereof adhered to said carbon-graphite rings and the other face thereof adhered to said brackets 50.

FIGS. 2 and 10 illustrate on form of a sleeve 28 and a ring or seal 44 of graphite. As is seen in FIG. 10 the inner surface of the sleeve 28 has an angular or conical wall 54 and an annular wall 100. In the annular wall 100 is a recess or cavity 58 having a spring 57 positioned therein.

The seal 44 has a stationary annular face 40 and a sloping angular or conical outer face 102.

The wall 54 and the conical face 102 slope in substantially the same direction and are substantially parallel. The ring 44 has an annular face 104 and which face is substantially parallel to the annular face 40 and also substantially parallel to the annular wall 100. There is attached to the conical face 102 and annular face 104 the soft flexible yieldable material 48. There is positioned over the soft flexible yieldable material 48 a hard protective shell 50. The hard protective shell 50 has a sloping region substantially parallel to the conical face 102 and to the wall 54 and has a straight region 68 substantially parallel to the annular wall 100.

The spring 57 is positioned in the cavity in recess 58 and pushes against the portion 68 of the hard protective shell 50. Also, there is positioned between the portion 66 of the hard protective shell 50 and the wall 54 an O-ring 55. The O-ring 55 functions as a sealing agent and also, because of the sloping wall 54 and the conical face 102, functions to push the ring 44 and stationary annular face 40 of said ring against the annular face 36 of the outer bearing race 24.

Again, the annular ring 44 is of graphite.

In FIG. 6 there is illustrated a fragmentary portion 110 of a rolling cutter having a sleeve 112. The sleeve 112 has an inner cylindrical or radial surface 114 and an annular surface 116. In the wall of the sleeve there is a recess or cavity 118 and a spring 120 is positioned in said recess or cavity.

In the rolling cutter 110 there is a rotating or revolving outer bearing race 122. Also, there is a ring 124 of graphite having an annular sealing surface 126 which seals against annular surface 128 against the surface of the outer bearing race 122.

The ring 124 has an outer flat cylindrical or radial surface 130 and an annular surface 132. The annular surface 132 is substantially parallel to the annular sealing surface 126 and also substantially parallel to the wall 116. There is positioned on the surface 132 a hard, protective metal or shell 134 and which shell extends in the form of a ring or a torus on the inner surface of 132 and inwardly of the inner cylindrical radial surface 114. The spring 120 pushes against the inner end of the hard protective shell 134 so as to push the ring 124 and the sealing surface 126 of said ring against the sealing surface 128 of the outer race 122.

There is an O-ring 136 positioned between the inner cylindrical surface 114 and the outer cylindrical surface 130. This O-ring functions as a sealing agent and does not function to force the sealing surface 126 against the sealing surface 128. In fact, any force exerted by the O-ring 136 to force the sealing surface 126 against the sealing surface 128 is an incidental force.

In FIG. 7 there is illustrated substantially the same structure as in FIG. 6 except that there is positioned between the hard protective shell 134 and the ring 124 a flexible yieldable material 138. This flexible yieldable material 138 takes up shock and vibrations in the rolling cutter. The ring 124 may be of metal or of graphite. The O-ring 136 may be of rubber or a suitable plastic such as polyurethane. The hard protective shell 134 may be of metal such as a steel ring. The flexible yieldable material 138 may be of rubber or of plastic such as polyurethane or another suitable plastic.

In FIG. 8 there is illustrated a rolling cutter 150 having a sleeve 152. The inner surface of said sleeve 152 is an angular or conical inner surface 154. The sleeve has an annular side wall 156. In the sleeve 152 there is a cavity or recess 158 and in the cavity or recess 158 there is a spring 160.

The rolling cutter 150 has an outer race 162 with an annular sealing surface 164. Also, the cutter 150 has a ring of graphite with an annular sealing surface 168 which bears against the annular sealing surface 164 of the race 162. The ring 166 has an outer cylindrical or radial surface 170 and an outer annular surface 172. The annular surface 172 is substantially parallel to the sealing surface 168 and also is substantially parallel to the wall 156.

There is attached to the surface 172 of the ring 166 a circular metal plate 176. The spring 160 bears against the inner surface of the plate 176 so as to push the ring 166 and the sealing surface 168 against the sealing surface 164.

There is positioned an O-ring 178 between the inner angular or conical surface 154 and the outer cylindrical or radial surface 170. The O-ring 178 functions primarily as a sealing agent to keep dirt and extraneous matter out of the bearings in the interior of the rolling cutter. Any force exerted by the O-ring 178 to force the ring 166 against the outer race 162 and the annular face 168 against the annular face 164 is only incidental. This forcing of the face 168 against the face 164 is achieved by means of a spring 160.

In FIG. 9 there is illustrated a fragmentary portion of a rolling cutter 180 having a sleeve 182 and an inner cylindrical or radial surface 184. The sleeve 182 has an annular wall 186. In the annular wall 186 there is a cavity or recess 188. In the cavity 188 there is a spring 190.

The rolling cutter 180 has an outer bearing race 192 with an annular surface 194.

In the rolling cutter 180 there is also a ring 196 of graphite. Said ring 196 has an annular surface 198 for sealing with the surface 194. Further, the ring 196 has an outer radial or cylindrical surface 200 and a sloping conical or angular surface 202. Further, the ring 196 has an outer annular surface 204. On the annular surface 204 there is positioned a ring of a flexible yieldable material 206 and a hard protective shell or ring 208. The ring 208 extends inwardly of the ring 196. The spring 190 bears against the inner end of the ring 208 so as to push the ring 196 against the race 192 and to push the sealing surface 198 against the sealing surface 194.

There is positioned between the outer sloping or conical surface 202 and the inner cylindrical or radial surface 184 an O-ring 210. Said O-ring bears against the sloping surface 202 so as to force the ring 196 against the race 192 and to force the surface 198 against the surface 194. In addition, the O-ring 210 functions as a sealing agent for sealing the interior of the rolling cutter 180 against the entrance of extraneous dirt, rock and the like.

In the cutter 180 the ring 196 is forced against the ring 192 and the surface 198 is forced against the surface 194 by a combination of the spring 190 pushing against the hard protective ring 208 and by the O-ring 210 pushing against the sloping surface 202.

In FIG. 11 there is illustrated a fragmentary portion of a rolling cutter 220 having a sleeve 222 and an inner cylindrical or radial surface 224. The sleeve 222 has an annular wall 226.

In the annular wall 226 there is a cavity or recess 228. In the cavity 228 there is a spring 230.

The rolling cutter 220 has an outer bearing race 232 with an annular surface 234.

In the rolling cutter 220 there is also a ring 236. Said ring has an annular surface 238 for sealing with the surface 234. Further, the ring 236 has an outer radial or cylindrical surface 240. Further, the ring 236 has an outer annular surface 242. In FIG. 11 it is seen that the cavity or recess 228 is aligned with the ring 236. Also, the spring 230 bears directly against the annular surface 242 of the ring 236 so as to force the annular sealing surface 238 of the ring against the annular sealing surface 234 of the bearing race 232.

There is positioned between the outer radial surface 240 of the ring 236 and the inner cylindrical or radial surface 224 an O-ring 246. The O-ring 246 functions as the seal and any urging of the O-ring 246 on the ring 236 so as to force the seal 236 against the bearing race 232 is of incidental importance. The primary function of the O-ring 246 is to function as a seal.

In FIG. 12 there is illustrated a fragmentary portion of a rolling cutter 250 having a sleeve 252 and an inner cylindrical or radial surface 254 but with the tip conically sloping at 256. The sleeve 252 has an annular wall 258. In the annular wall 258 there is a cavity or recess 260. In the cavity or recess 260 there is a spring 262.

The rolling cutter 250 has an outer bearing race 264 with an annular surface 266.

In the rolling cutter 250 there is a ring 268. Said ring 268 has an annular surface 270 for sealing with the annular surface 266. Further, the ring 268 has an outer flat radial or cylindrical surface 272. In addition, the ring 268 has an outer radial or cylindrical surface 272. In addition, the ring 268 has an outer annular surface 274. On the annular surface 274 there is positioned a ring of a flexible yieldable material 276. The ring 276 is of slightly larger external diameter than the ring 268 so that the ring 276 projects outwardly farther or beyond the external diameter of the ring 268. Also, there is positioned on the outside of the ring 276 a ring 278 having a larger external diameter than the ring 268 and a smaller internal diameter than the ring 268 so that the ring 276 projects farther outwardly than the ring 268 and also projects farther inwardly than the ring 268. The ring 276 may be adhered to the ring 268 and also to the ring 278. In FIG. 12 it is seen that the spring 262 urges against the hard protective shell 278 so as to urge the ring 268 and the annular sealing surface 270 against the annular sealing surface 266 on the bearing race 264.

There is positioned between the outer radial or cylindrical surface 272 to the ring 268 and the inner radial or cylindrical surface 254 to the sleeve 252 an O-ring 280. The primary function of the O-ring 280 is that of a seal. The primary function of the spring 262 is to force the ring 268 against the bearing race 264. Any forcing of the ring 268 against the bearing race 264 by the O-ring 280 is incidental. Also, it is seen that with the projection of the ring 276 and the projection of the ring 278 outwardly and beyond the outer radial surface 272 of the ring 268 that there is an effective barrier for preventing the O-ring 280 working over and beyond the annular surface 274 and the ring 276 and thereby not function as a seal.

FIG. 13 is a fragmentary lateral cross-sectional view of another sleeve having an inner recessed partially circular seat for receiving and seating a bull ring and an outer cylindrical or an outer radial surface with said O-ring between them and a spring bearing against the graphite ring.

In FIG. 13 there is illustrated a fragmentary portion of a rolling cutter 300 having a rotor 302 and a sleeve 304. The sleeve 304 has an inner recessed partially circular seat 306 and an outer cylindrical lip 308. Also, the sleeve 300 has an annular wall 310 and a recess 312 in the wall 310. The rotor comprises a bearing race 314. There is a graphite ring 316 having an annular sealing surface 318. The race 314 has an annular sealing surface 320. The surfaces 318 and 320 are in contact with each other and seat with each other. The ring 316 has an outer cylindrical or an outer radial surface 321. There is positioned between the outer cylindrical surface 321 and the inner recessed partially circular seat 306 a sealing means or an O-ring 322. It is seen that the O-ring 322 in the inner recessed partially circular seat 306 does not force the sealing surface 318 of the graphite ring 316 against the sealing surface 320 of the bearing race 314. The spring 324 in the recess 312 forces the graphite ring 316 against the bearing race 314 so that the annular surface 318 bears against and seats with the annular surface 320 of the bearing race 314.

In FIG. 13 and sleeve 300, I have provided an inner recessed partially circular seat for receiving and seating an O-ring and which O-ring does not force the graphite ring against the bearing race. Further, the O-ring 322 is in this circular seat 306 and is positioned there so that it is possible to assemble the sleeve structure, the sealing means, and the graphite ring 316. With the use of such a circular seat 306, it is possible to use the graphite ring 316 having an outer cylindrical surface 321. As a result, the cost of manufacture of the graphite ring 316 is considerably reduced and therefore the cost of the seals and the rolling cutter are reduced.

The hard protective rings 68, 86, 278, 134, 176, and 208 may be of metal such as steel. The rings 44, 46, 124, 268, 236, 166, 196, and 316 may be of graphite.

The yieldable flexible material 48, 80, 138, 206, and 276 may be of rubber or a plastic, such as polyurethane.

The O-rings 55, 56, 136, 178, 210, 246, 280, and 322 may be of rubber or a suitable plastic, such as polyurethane.

As previously stated the graphite-to-metal seal need not be run in, prior to actual use, as is necessary with metal-to-metal seals. This is a saving in time and money.

Obviously, changes may be made in the forms, dimensions and arrangements of the parts of my invention without departing from the principle thereof, the above setting forth only a preferred form of embodiment of my invention.

Having presented my invention, what I claim is:

1. A sealing means comprising in combination:
   a. a fixed shaft assembly;
   b. a rotor;
   c. an antifriction bearing means mounting said rotor on said fixed shaft assembly ring of a rotary seal assembly;
   d. said seal assembly comprising a radial metallic ring on the race of said antifriction bearing means and which radial metallic ring serves as a radial sealing face;
   e. a graphite ring carried by said fixed shaft assembly and having a radial sealing face disposed in sliding contacting relation with said radial sealing face of said metallic ring;
   f. a first means resiliently urging said metallic ring and said graphite ring toward each other;
   g. said assembly having a sleeve;
   h. said sleeve having an inner conical surface;
   i. said graphite ring having an outer cylindrical surface; and,
   j. a second sealing means positioned between said inner conical surface and said outer cylindrical surface.

2. A sealing means according to claim 1 and comprising:
   a. said second sealing means being an O-ring.

3. A sealing means according to claim 1 and comprising:
   a. said first means comprising a spring positioned between said sleeve and said graphite ring; and,
   b. said spring urging said graphite ring toward said race.

4. A sealing means according to claim 1 and comprising:
   a. a plate connecting with said graphite ring and on that face of the ring facing said sleeve;
   b. said first means comprising a spring positioned between said sleeve and said plate; and,
   c. said spring urging said graphite ring toward said race.

5. A sealing means according to claim 4 and comprising:
   a. said second sealing means being an O-ring.

6. A sealing means comprising in combination:
   a. a fixed shaft assembly;
   b. a rotor;
   c. an antifriction bearing means mounting said rotor on said fixed shaft assembly of a rotary seal assembly;

d. said seal assembly comprising a radial metallic ring on the race of said antifriction bearing means and which radial metallic ring serves as a radial sealing face;
e. a graphite ring carried by said fixed shaft assembly and having a radial sealing face disposed in sliding contacting relation with said radial sealing face of said metallic ring;
f. a first means resiliently urging said metallic ring and said graphite ring toward each other;
g. said assembly having a sleeve;
h. said sleeve having an inner cylindrical surface;
i. said graphite ring having an outer sloping surface; and,
j. a second sealing means positioned between said inner cylindrical surface and said outer sloping surface.

7. A sealing means according to claim 6 and comprising:
a. said second sealing means being an O-ring.

8. A sealing means according to claim 6 and comprising:
a. said first means comprising a spring positioned between said sleeve and said graphite ring; and,
b. said spring urging said graphite ring toward said race.

9. A sealing means according to claim 6 and comprising:
a. a plate connecting with said graphite ring and on that face of the ring facing said sleeve;
b. said first means comprising a spring positioned between said sleeve and said plate; and,
c. said spring urging said graphite ring toward said race.

10. A sealing means according to claim 9 and comprising:
a. said second sealing means being an O-ring.

11. A sealing means comprising in combination: a fixed shaft assembly, a rotor, an antifriction bearing means mounting said rotor on said fixed shaft assembly, and a rotary seal assembly, said seal assembly comprising a radial metallic ring on a race of said antifriction bearing means and which radial metallic ring serves as a radial sealing face, a graphite ring carried by said fixed shaft assembly and having a radial sealing face disposed in sliding contacting relation with said radial sealing face of said metallic ring, and a first means resiliently urging said metallic ring and said graphite ring toward each other and sealing said graphite ring to said fixed shaft assembly and including a resilient O-ring positioned between said graphite ring and said fixed shaft assembly.

12. A sealing means according to claim 11 in which said first means also includes spring means between said graphite ring and said fixed shaft assembly.

13. A sealing means according to claim 11 in which said radial metallic ring is part of the said bearing race of said antifriction bearing means.

14. A sealing means according to claim 11 in which said graphite ring has a sloping surface facing away from said metallic ring, said fixed shaft assembly having a sloping surface radially spaced from the said sloping surface on said graphite ring, said O-ring being positioned between said sloping surfaces and urging graphite seal toward said metallic ring while sealing between said sloping surfaces.

15. A sealing means according to claim 11 which includes a protective retainer shell ring on the graphite seal on the side thereof facing away from said metallic ring, said protective retainer shell ring having a generally radial part and an annular part, said resilient O-ring being positioned between said radial part of the protective retainer shell ring and an adjacent part of the fixed shaft assembly, and spring means positioned between said annular part of the protective retainer shell ring and an adjacent part of the fixed shaft assembly.

16. A sealing means according to claim 11 which includes a sleeve forming a part of said fixed shaft assembly and disposed on the opposite side of said graphite ring from said metallic ring, said sleeve having an inner conical surface adjacent said graphite ring, said graphite ring having an outer sloping surface substantially parallel to said conical surface and spaced therefrom, and said resilient O-ring being positioned between and sealingly engaging said inner conical surface and said outer sloping surface.

17. A sealing means according to claim 11 which includes a sleeve forming a part of said fixed shaft assembly and disposed on the opposite side of said graphite ring from said metallic ring, said sleeve having an inner cylindrical surface adjacent said graphite ring, said graphite ring having an outer cylindrical surface, and said resilient O-ring being positioned between and sealingly engaging said inner cylindrical surface and said outer cylindrical surface.

18. A sealing means according to claim 11 which includes a sleeve forming a part of said fixed shaft assembly and dispose on the opposite side of said graphite ring from said metallic ring, said sleeve having an inner conical surface adjacent said graphite ring, said graphite ring having an outer cylindrical surface, and said resilient O-ring being positioned between and sealingly engaging said inner conical surface and said outer cylindrical surface.

19. A sealing means according to claim 11 which includes a sleeve forming a part of said fixed shaft assembly and disposed on the opposite side of said graphite ring from said metallic ring, said sleeve having an inner cylindrical surface adjacent said graphite ring, said graphite ring having an outer sloping surface radially spaced from said cylindrical surface, and said resilient O-ring being positioned between and sealingly engaging said inner cylindrical surface and said outer sloping surface.

20. A sealing means according to claim 11 which includes a protective retainer shell ring on the graphite ring, and positioning means engaging said shell ring and said fixed shaft assembly and operable for restricting rotation of said protective retainer shell ring and said graphite ring with respect to said fixed shaft assembly.

21. A sealing means according to claim 20 in which said fixed shaft assembly comprises a recess and said positioning means includes a pin connecting said recess and said protective retainer shell ring to restrict rotation of said protective retainer shell ring and said graphite ring with respect to said fixed shaft assembly.

22. A sealing means according to claim 11 in which said fixed shaft assembly includes a sleeve on the opposite side of said graphite ring from said metallic ring, said sleeve having an inner recessed partially circular seat, said graphite ring having an outer cylindrical surface, and said resilient O-ring being positioned between and sealingly engaging said inner recessed partially circular seat and said outer cylindrical surface.

* * * * *